US011169838B2

(12) United States Patent
Laplace et al.

(10) Patent No.: US 11,169,838 B2
(45) Date of Patent: Nov. 9, 2021

(54) HYPERCALL IMPLEMENTATION IN A VIRTUALIZED COMPUTER SYSTEM

(71) Applicant: VMware, Inc., Palo Alto, CA (US)

(72) Inventors: Cyprien Laplace, Cambridge, MA (US); Regis Duchesne, Monts-de-Corsier (CH); Andrei Warkentin, North Andover, MA (US); Ye Li, Newton Highlands, MA (US); Alexander Fainkichen, Southborough, MA (US)

(73) Assignee: VMware, Inc., Palo Alto, CA (US)

( * ) Notice: Subject to any disclaimer, the term of this patent is extended or adjusted under 35 U.S.C. 154(b) by 104 days.

(21) Appl. No.: 16/744,351

(22) Filed: Jan. 16, 2020

(65) Prior Publication Data
US 2021/0224089 A1 Jul. 22, 2021

(51) Int. Cl.
*G06F 9/455* (2018.01)
(52) U.S. Cl.
CPC ...... *G06F 9/45558* (2013.01); *G06F 9/45545* (2013.01); *G06F 2009/45591* (2013.01)
(58) Field of Classification Search
CPC ............. G06F 9/45558; G06F 9/45545; G06F 2009/45591
See application file for complete search history.

(56) References Cited

U.S. PATENT DOCUMENTS

| 9,465,617 | B1 * | 10/2016 | Warkentin | .......... G06F 9/30145 |
| 2015/0371036 | A1 * | 12/2015 | Warkentin | .............. G06F 21/74 726/16 |
| 2017/0364379 | A1 * | 12/2017 | Warkentin | .......... G06F 11/3636 |

* cited by examiner

Primary Examiner — Dong U Kim
(74) Attorney, Agent, or Firm — Patterson & Sheridan, LLP

(57) ABSTRACT

An example method of interfacing with a hypervisor in a computing system is described. The computing system includes a processor having at least three hierarchical privilege levels including a third privilege level more privileged than a second privilege level, the second privilege level more privileged than a first privilege level. The method includes configuring, by the hypervisor executing at the third privilege level, the processor to trap reads to a debug communication channel (DCC) status register of the processor to the third privilege level; trapping, at the hypervisor, a read to the DCC status register by guest software executing in a virtual machine (VM) managed by the hypervisor, the guest software executing at the first or second privilege level; reading, at the hypervisor, a plurality of registers of the processor to obtain data stored by the guest software; and returning execution from the hypervisor to the guest software.

20 Claims, 4 Drawing Sheets

HYPERCALL IMPLEMENTATION IN A VIRTUALIZED COMPUTER SYSTEM

BACKGROUND

A computing system can include an operating system (OS) executing on a hardware platform, which includes processor(s), memory, storage, input/output (IO) devices, and the like. When the OS executes directly on the hardware platform, the OS is referred to herein as a "host OS." Computer virtualization is a technique that involves encapsulating the hardware platform of the computing system into virtual hardware platforms on which virtual machine(s) execute under control of virtualization software. A virtual machine (VM) provides virtual hardware abstractions for processor, memory, storage, and the like to a guest operating system (OS) and guest application(s) that run on the guest OS. The virtualization software provides virtual hardware platforms and virtual execution environments for the virtual machine(s).

A guest OS in a VM can include support tools for communicating with the virtualization software (e.g., a hypervisor). The support tools include components that execute in kernel mode and components that execute as regular applications (e.g., user mode). These support tools provide "back door" interfaces to interact with various hypervisor components to provide a better end-user experience, as well as making the guest OS virtualization-aware. One approach to perform a call into the hypervisor from a guest OS in a VM is to use a hypervisor call instruction. However, on some central processing units (CPUs), such a hypervisor call is restricted to privileged mode (e.g., kernel mode) code, rendering it unusable by regular applications (e.g., user mode code). It is desirable to provide a technique for all guest code (e.g., kernel mode and user mode) to interface with the hypervisor.

SUMMARY

One or more embodiments provide for hypercall implementation in a virtualized computing system. In an embodiment, a method of interfacing with a hypervisor in a computing system is described. The computing system includes a processor having at least three hierarchical privilege levels including a third privilege level more privileged than a second privilege level, the second privilege level more privileged than a first privilege level. The method includes configuring, by the hypervisor executing at the third privilege level, the processor to trap reads to a debug communication channel (DCC) status register of the processor to the third privilege level; trapping, at the hypervisor, a read to the DCC status register by guest software executing in a virtual machine (VM) managed by the hypervisor, the guest software executing at the first or second privilege level; reading, at the hypervisor, a plurality of registers of the processor to obtain data stored by the guest software; and returning execution from the hypervisor to the guest software.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
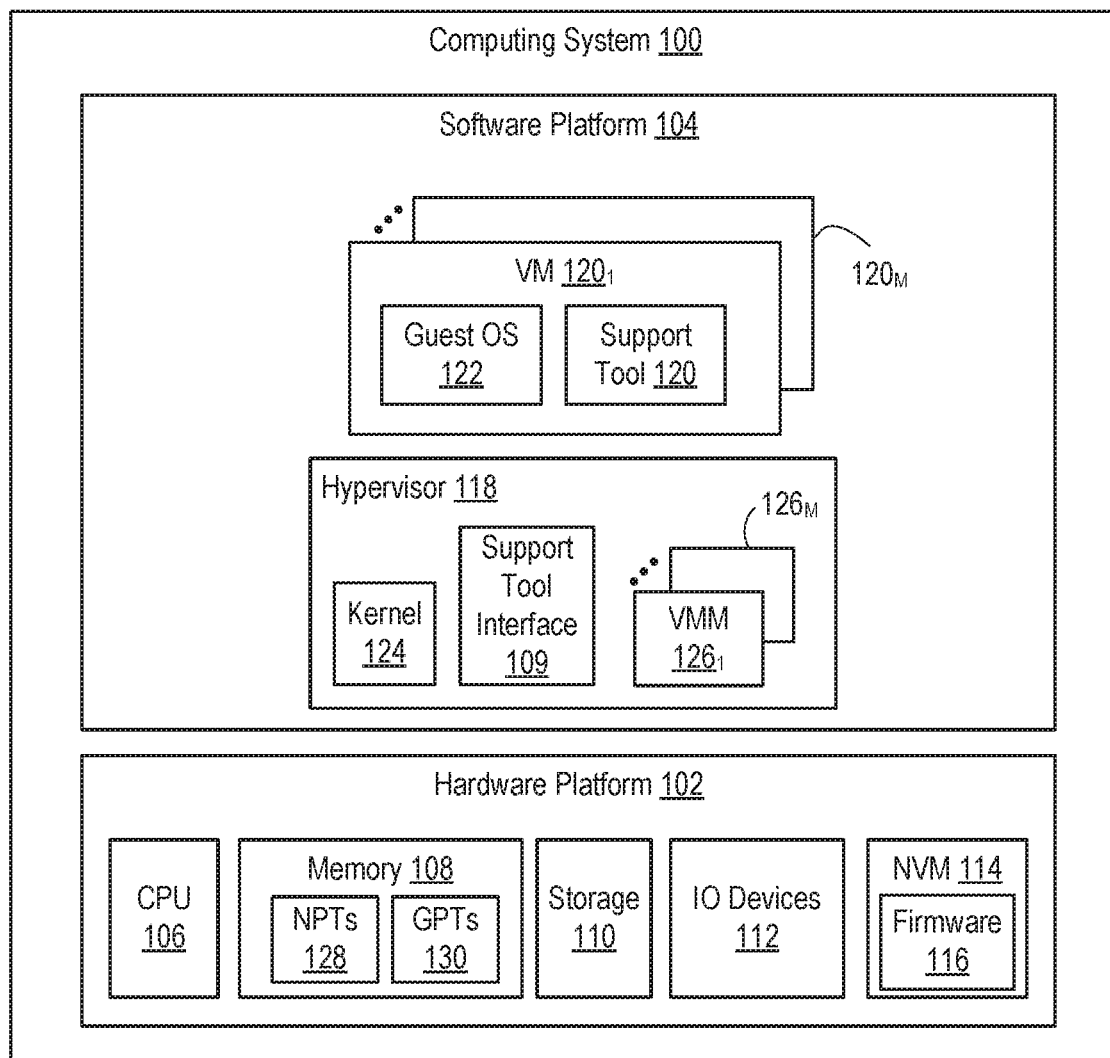
FIG. 1 is a block diagram depicting a computing system according to an embodiment.

FIG. 1 is a block diagram depicting a computing system 100 according to an embodiment. Computing system 100 includes a software platform 104 executing on a hardware platform 102. Hardware platform 102 may include conventional components of a computing device, such as a central processing unit (CPU) 106, system memory ("memory" 108), storage 110, input/output (TO) devices 112, a non-volatile memory (NVM) 114. CPU 106 is configured to execute instructions, for example, executable instructions that perform one or more operations described herein and may be stored in memory 108 and storage 110. Memory 108 is a device allowing information, such as executable instructions, virtual disks, configurations, and other data, to be stored and retrieved. Memory 108 may include, for example, one or more random access memory (RAM) modules. Storage 110 includes local storage devices (e.g., one or more hard disks, flash memory modules, solid state disks, and optical disks) and/or a storage interface that enables computing system 100 to communicate with one or more network data storage systems. Examples of a storage interface are a host bus adapter (HBA) that couples computing system 100 to one or more storage arrays, such as a storage area network (SAN) or a network-attached storage (NAS), as well as other network data storage systems. IO devices 112 include conventional interfaces known in the art, such as one or more network interfaces, serial interfaces, universal serial bus (USB) interfaces, and the like. NVM 114 is a device allowing information to be stored persistently regardless of the state of power applied to computing system 100 (e.g., FLASH memory or the like). NVM 114 stores firmware 116 for computing system 100, such as a Basic Input/Output System (BIOS), Unified Extensible Firmware Interface (UEFI), or the like.

Figure 2:
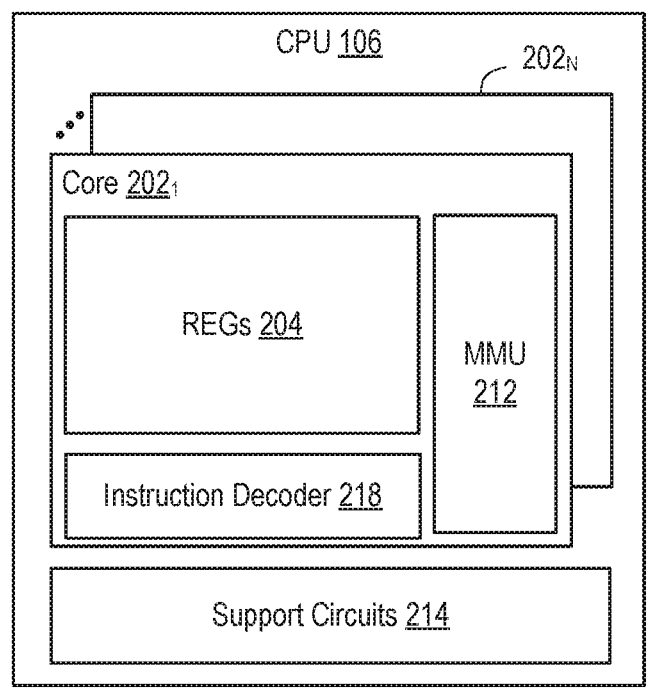
FIG. 2 is a block diagram depicting a central processing unit (CPU) according to an embodiment.

FIG. 2 is a block diagram depicting CPU 106 according to an embodiment. CPU 106 includes one or more cores 202 (e.g., cores $202_1 \ldots 202_N$, where N is an integer greater than zero) and support circuits 214. Each core 202 is a microprocessor or like type processor element. Each core 202 includes, among other components, registers 204, a memory management unit (MMU) 212, and an instruction decoder 218. Other components of core 202 (e.g., an arithmetic logic unit (ALU), floating point unit (FPU), program registers, cache memory, etc.) are omitted for clarity. Support circuits 214 include circuitry shared by cores $202_1 \ldots 202_N$, such as cache memory, direct memory access (DMA) circuits, interrupt controller circuits, an input/output MMU (IOMMU), and the like.

Code is executed on a core 202 at a particular privilege level (PL) of a hierarchy of at least three privilege levels. In an embodiment, each core 202 is a processing element ("processor") compliant with the ARM®v8 architecture or the like that includes four PLs known as exception levels (ELs), which are defined as EL0, EL1, EL2, and EL3 in order of increasing code-execution privilege. Execution at EL0 is referred to as "unprivileged execution" and execution at any of EL1, EL2, and EL3 is referred to as "privileged execution." EL0 is an example of a "user PL;" EL1 is an example of a "supervisor PL;" EL2 is an example of a "hypervisor PL;" and EL3 is an example of a "secure PL." In general, each core 202 supports a hierarchy of at least three hierarchical privilege levels having distinguishable code execution privileges, such as a user PL, a supervisor PL, and a hypervisor PL. Various examples described herein refer to a processor (e.g., a core 202) having the ARM®v8 hardware architecture and executing in the 64-bit execution state (referred to as AArch64). It is to be understood that the virtualization detection techniques described herein can be employed by executing programs on processors having similar hardware architectures consistent with the functional description herein. For example, the techniques described herein can be used with a processor having the ARM®v8 hardware architecture and executing in the 32-bit execution state (referred to as AArch32). The techniques described herein can be used with other types of processors, such as processors compliant with the Power Architecture®.

Registers 204 include registers for use by code to configure and control core 202. Registers 204 can be associated with different privilege levels. For example, registers 204 include PL0 registers, PL1 registers, and PL2 registers, etc. PL0 registers are accessible by code executing at any privilege level. PL1 registers are accessible by code executing at PL1 or above. PL2 registers are accessible by code executing at PL2 or above. PL2 registers can include register(s) or field(s) of registers that control whether the PL2 privilege level is enabled. PL2 registers can also include register(s) or field(s) of registers that control traps of PL0/PL1 register access to PL2. When a trap is enabled, core 202 generates an exception to PL2 if program code executing at PL0 or PL1 accesses certain PL0 registers and/or certain PL1 registers associated with the trap.

Instruction decoder 218 supports an instruction set of core 202. Instruction decoder 218 decodes input instructions and controls functional units of core 202 to perform the input instructions. The instruction set of core 202 can include branch instructions, exception generating instructions, system instructions, data processing instructions, load and store instructions, and the like. Example instructions described herein are part of the A64 instruction set of an ARM®-compliant processor. Those skilled in the art will appreciate that the instructions so described or ones substantially similar thereto may be found in instruction sets of other types of processors, including the A32 instruction set of an ARM®-compliant processor.

MMU 212 implements memory management in the form of paging of memory 108. MMU 212 controls address translation and access permissions for memory accesses made by core 202. MMU 212 implements a plurality of address translation schemes based on privilege level (also referred to as "translation schemes"). Each translation scheme generally takes an input address (IA) and, if permitted based on the defined access permissions, returns an output address (OA). If an address translation cannot be performed (e.g., due to violation of the access permissions), MMU 212 generates an exception. MMU 212 is controlled by one or more of system registers 204. MMU 212 can include one or more translation lookaside buffers (TLBs) (not shown) that cache address translations. One type of translation scheme includes a single stage of address translation that receives a virtual address (VA) in a virtual address space and outputs a physical address (PA) in a physical address space. The virtual address space is a flat logical address space managed by software. The physical address space includes the physical memory map that includes memory 108. Another type of translation scheme includes two stages of address translation. The first stage of address translation receives a VA and outputs an intermediate physical address (IPA) in an intermediate physical address space. The second stage of address translation receives an IPA and outputs a PA. The IPA address space is a flat logical address space managed by software.

Returning to FIG. 1, software platform 104 includes a virtualization layer that abstracts processor, memory, storage, and networking resources of hardware platform 102 into one or more virtual machines ("VMs") $120_1 \ldots 120_M$ (collectively VMs 120) that run concurrently on computing system 100. VMs 120 run on top of the virtualization layer, referred to herein as a hypervisor 118, which enables sharing of the hardware resources by VMs 120. One example of hypervisor 118 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Hypervisor 118 is known as a Type-1 or "bare-metal" virtualization software.

Each VM 120 supported by hypervisor 118 includes guest software that runs on the virtualized resources supported by hardware platform 102. In the example shown, the guest software of each VM 120 includes a guest OS 122 and a support tool 120. Guest OS 122 can be any commodity operating system known in the art, such as such as Linux®, Microsoft Windows®, Mac OS®, or the like. Support tool 120 is configured to interact with a support tool interface 109 in hypervisor 109 as described further herein.

Hypervisor 118 includes, among other components, a kernel 124, support tool interface 109, and virtual machine monitors (VMMs) $126_1 \ldots 126_M$ (collectively VMMs 126). Kernel 124 provides operating system functionality (e.g., process creation and control, file system, process threads, etc.), as well as CPU scheduling and memory scheduling. VMMs 126 are processes scheduled by kernel 124 to implement the virtual system support for VMs 120. Each VMM 126 manages a corresponding virtual hardware platform. The virtual hardware platform includes virtual CPUs (vCPUs), guest physical memory, virtual IO devices, and the like. In embodiments, kernel 124 executes at PL2 or PL1; support tool interface 109 executes at PL2 or PL1; VMMs execute at PL2; guest OS 122 in each VM 120 executes at PL1; and support tool 120 executes at PL1 or PL0.

In embodiments, support tool 120 provides a back door interface between guest OS 122 or other guest code in VM 120 and hypervisor 118. One technique for accessing hypervisor 118 from VM 120 is to use a hypervisor call instruction, such as the HVC instruction. However, the HVC instruction is restricted to privileged code (e.g., EL1), which renders it unusable by unprivileged code (e.g., EL0). Another technique involves a wait for event instruction, such as the WFE instruction. However, the WFE instruction is ill-suited for use by unprivileged code (e.g., EL0), as privileged code (e.g., EL1) can trap the WFE instruction before reaching hypervisor 118 executing at EL2. Another technique is to use a break instruction, such as the BRK instruction. However, use of the BRK instruction for this purpose interferes with efficiently supporting hosted debug inside of the VM or debugging the guest OS itself. Finally, even if restricting support tool 120 to privilege (EL1) code only, the HVC instruction has some disadvantages. For a system without EL2 software loaded, executing an HVC instruction will likely result in a crash. Some hypervisors can also treat unknown HVCs as an error condition. Thus, an HVC instruction cannot be used to detect a hypervisor.

Embodiments herein use an alternative approach that functions from both unprivileged and privileged code, works equally as well with hosted debug virtualization, and allows for detection of the hypervisor safely. It is desirable for such an instruction to satisfy the following conditions: (1) can execute in unprivileged code (e.g., EL0); (2) can be trapped by the hypervisor; (3) can be trapped by the hypervisor before getting trapped by code executing at EL1; (4) is not part of something that is tedious to virtualize; (5) is implemented in all implementations of the CPU; (6) not typically executed in a VM (e.g., rarely called); and (7) has "improbable" encodings such that there is a way to use the instruction atypically.

Accordingly, in embodiments, support tool 120 uses a debug communication channel of the CPU to implement a back door interface between guest code and the hypervisor. A debug communication channel (DCC) is a mechanism in the CPU to pass information between a target and a host debugger. For example, a DCC can include a data read register, a data write register, and a control register for synchronized handshaking between the CPU and a debugger. The DCC is accessed using specific instructions in the instruction set of the CPU, which are utilized to provide the back door interface. The CPU also includes system registers for controlling/monitoring the DCC, including a DCC status register and several debug control registers as discussed further below.

Figure 3:
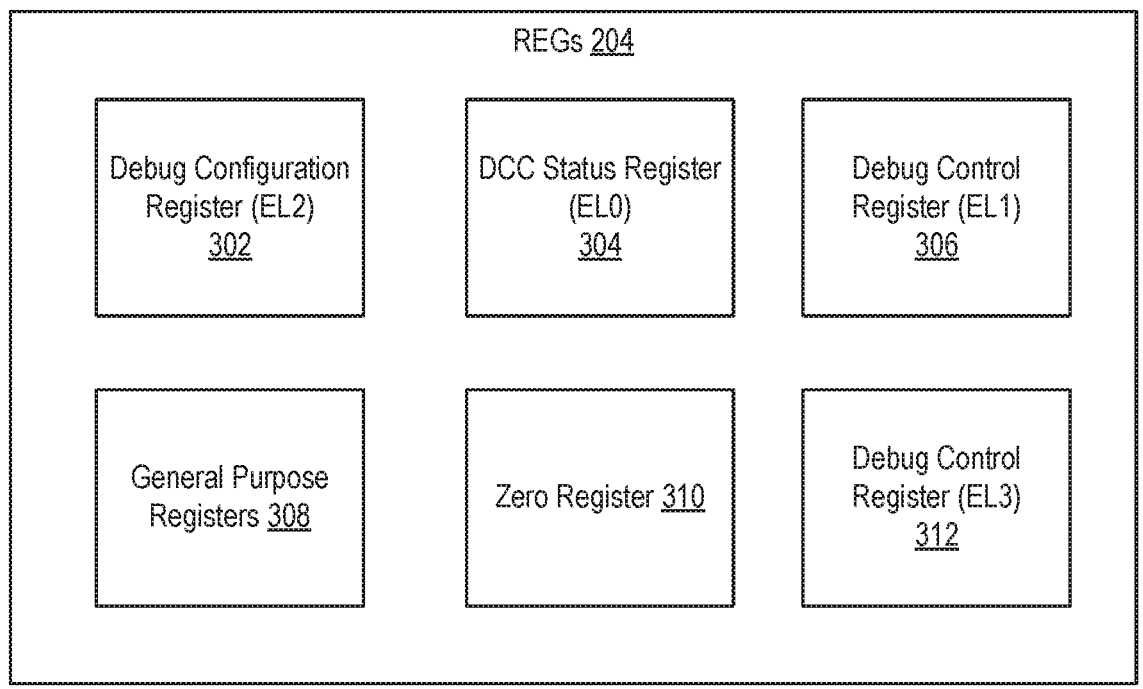
FIG. 3 is a block diagram depicting a portion of registers associated with a debug subsystem of the processor according to an embodiment.

FIG. 3 is a block diagram depicting a portion of registers 204 associated with a DCC of the processor according to an embodiment. Registers 204 include a debug configuration registers for EL2, a DCC status register for EL0, a debug control register for EL1, and debug control register for EL3. Registers 204 also include a plurality of general purpose registers 308 and a zero register 310 (e.g., a register that only stores the value 0 that cannot be overwritten). Debug configuration register 302 includes at least one field that can be set to trap EL0 and EL1 access to debug system registers, including access to DCC status register 304. In an example, debug configuration register 302 can be the register MDCR_EL2 and the field can be MDCR_EL2.TDA.

Debug control register 306 includes at least one field that allows software executing at EL1 to trap access to debug system registers, including DCC status register 304. In an example, debug control register 306 can be the register MDSCR_EL1 and the field can be MDSCR_EL1.TDCC. As discussed below, hypervisor 118 shadows (virtualizes) debug control register 306 in order to prevent guest code from configuring the processor to trap access to DCC status register 304 to EL1. Debug control register 312 is a similar register as debug control register 306, but associated with EL3. The corresponding field must not be set by the system firmware, which would prevent hypervisor 118 from configuring the trap as discussed herein. In an example, debug control register 312 is MDCR_EL3 and the field is MDCR_EL3.TDA. General purpose registers 308 can be any register that can store data. Zero register 310 always stores zero, which cannot be overwritten. DCC status register 304 can be MSCCSR_EL0, for example.

Figure 4:
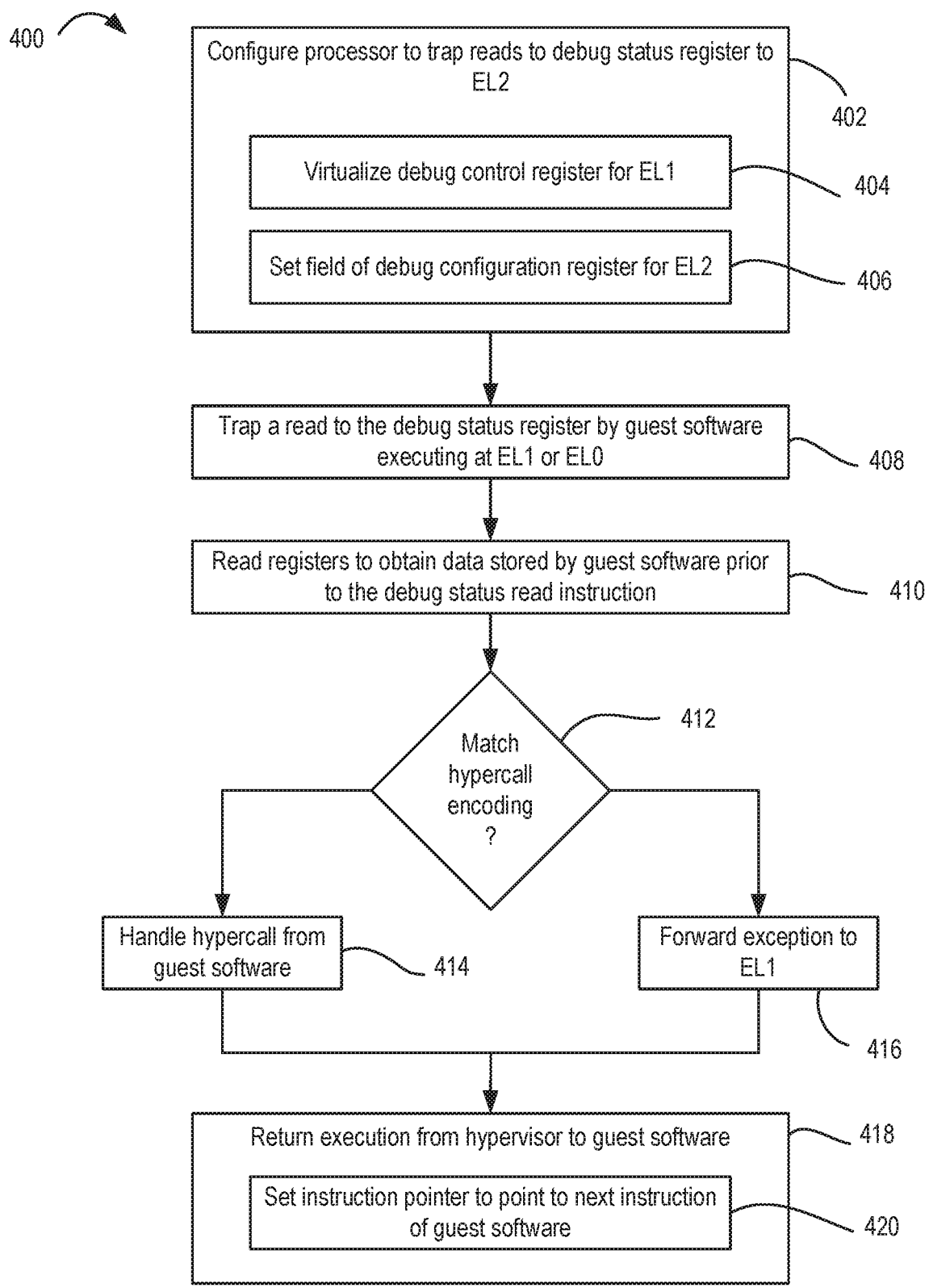
FIG. 4 is a flow diagram depicting a method of interfacing with a hypervisor in a virtualized computing system according to an embodiment.

FIG. 4 is a flow diagram depicting a method 400 of interfacing with a hypervisor in a virtualized computing system according to an embodiment. Method 400 begins at step 402, where hypervisor 118 configures CPU 106 to trap reads of DCC status register 304 to EL2. In an embodiment, hypervisor 118 virtualizes debug control register 306 to prevent guest software from trapping access to DCC status register 304 to EL1 (step 404). At step 406, hypervisor 118 sets a field of debug configuration register 302 to trap access to debug system registers to EL2, including access to DCC status register 304.

At step 408, hypervisor 118 traps a read to DCC status register 304 by guest software (e.g., support tool 120) executing at EL1 or EL0. At step 410, hypervisor 118 reads general purpose registers 308 to obtain data stored by the guest software prior to reading from the DCC status register to trigger the trap. At step 412, hypervisor 118 determines whether the data matches a hypercall encoding. Notably, the guest software stores the data in registers 308 according to a particular encoding referred to herein as a hypercall encoding. The encoding can be anything detectable by hypervisor 118 to indicate a hypercall, rather than an inadvertent trap.

If the data matches the hypercall encoding, method 400 proceeds to step 414, where hypervisor 118 handles the hypercall from the guest software. If the data does not match the hypercall encoding, method 400 proceeds to step 416, where hypervisor 118 forwards the exception to EL1 (e.g., to be handled by guest OS 122). At step 418, hypervisor 118 returns execution to the guest software. In an embodiment, at step 420, hypervisor 118 sets an instruction pointer to point to the next instruction of the guest software so the guest software can continue execution without again triggering the trap.

Figure 5:
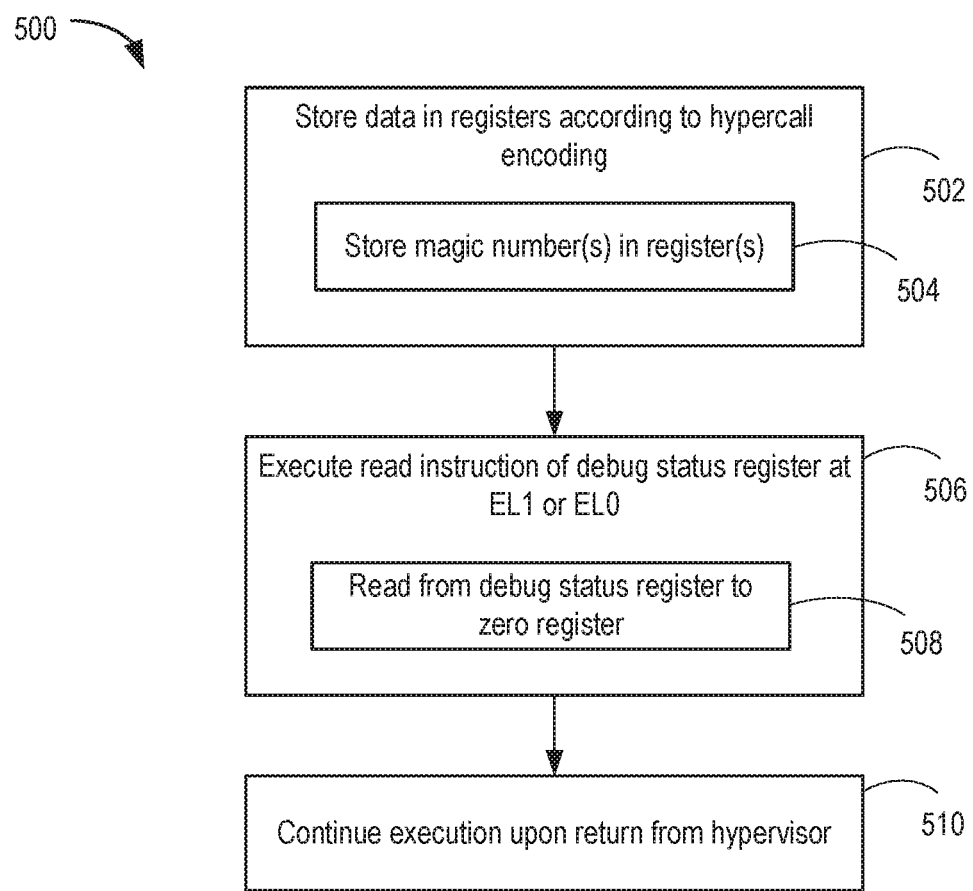
FIG. 5 is a flow diagram depicting a method of performing a hypercall from guest software according to an embodiment.

FIG. 5 is a flow diagram depicting a method 500 of performing a hypercall from guest software according to an embodiment. Method 500 can be executed by support tool 120 to make a hypercall into hypervisor 118. Method 500 begins at step 502, where support tool 120 stores data in general purpose registers 308 according to a designated hypercall encoding. The designated hypercall endoding is the encoding of parameters expected by hypervisor 118 for the hypercall. In an embodiment, the hypercall encoding includes storing one or more magic numbers in one or more registers to indicate the hypercall (step 504). At step 506, support tool 120 executes a read instruction of DCC status register 304. In an embodiment, support tool 120 reads the DCC status register to zero register 310 (step 508). Support tool 120 can be executing at EL0 or EL1. For example, support tool 120 can execute MRS XZR, MSCCSR_EL0. This is a transfer of the DCC status register to the zero register, effectively discarding the value. This sequence is not likely to be performed by code not intending a hypercall. Magic value(s) stored in the general purpose registers provide further safety. Thus, normal usage of DCC status register 304 is still possible to execute by guest software (e.g., usage not intending to be a hypercall). At step 510, support tool 120 continues execution upon return from hypervisor 118.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of interfacing with a hypervisor in a computing system, which includes a processor having at least three hierarchical privilege levels including a third privilege level more privileged than a second privilege level, the second privilege level more privileged than a first privilege level, the method comprising:

configuring, by the hypervisor executing at the third privilege level, the processor to trap reads to a debug communication channel (DCC) status register of the processor to the third privilege level;

trapping, at the hypervisor, a read to the DCC status register by guest software executing in a virtual machine (VM) managed by the hypervisor, the guest software executing at the first or second privilege level;

reading, at the hypervisor, a plurality of registers of the processor to obtain data stored by the guest software; and returning execution from the hypervisor to the guest software.

2. The method of claim 1, wherein the configuring comprises:
virtualizing, at the hypervisor, a debug control register for the first privilege level that allows for trapping reads to the DCC status register to the first privilege level.

3. The method of claim 2, wherein the configuring comprises:
setting, by the hypervisor, a field of a debug configuration register for the third privilege level to trap access to the DCC status register to the third privilege level.

4. The method of claim 1, wherein the read to the DCC status register by the guest software comprises a read instruction from the DCC status register to a zero register of the processor.

5. The method of claim 1, further comprising:
determining whether the data stored in the plurality of registers matches a hypercall encoding;
handling, at the hypervisor, a hypercall from the guest software in response to the data matching the hypercall encoding; and
forwarding an exception to the second privilege level in response to the data not matching the hypercall encoding.

6. The method of claim 5, wherein the hypercall encoding includes at least one magic number stored in at least one of the plurality of registers.

7. The method of claim 1, wherein the returning comprises setting an instruction pointer to point to a next instruction of the guest software.

8. A non-transitory computer readable medium having instructions stored thereon that when executed by a processor cause the processor to perform a method of interfacing with a hypervisor in a computing system, which includes a processor having at least three hierarchical privilege levels including a third privilege level more privileged than a second privilege level, the second privilege level more privileged than a first privilege level, the method comprising:
configuring, by the hypervisor executing at the third privilege level, the processor to trap reads to a debug communication channel (DCC) status register of the processor to the third privilege level;
trapping, at the hypervisor, a read to the DCC status register by guest software executing in a virtual machine (VM) managed by the hypervisor, the guest software executing at the first or second privilege level;
reading, at the hypervisor, a plurality of registers of the processor to obtain data stored by the guest software; and
returning execution from the hypervisor to the guest software.

9. The non-transitory computer readable medium of claim 8, wherein the configuring comprises:
virtualizing, at the hypervisor, a first debug control register for the first privilege level that allows for trapping reads to the DCC status register to the first privilege level.

10. The non-transitory computer readable medium of claim 9, wherein the configuring comprises:
setting, by the hypervisor, a field of a debug configuration register for the third privilege level to trap access to the DCC status register to the third privilege level.

11. The non-transitory computer readable medium of claim 8, wherein the read to the DCC status register by the guest software comprises a read instruction from the DCC status register to a zero register of the processor.

12. The non-transitory computer readable medium of claim 8, wherein the method further comprises:
determining whether the data stored in the plurality of registers matches a hypercall encoding;
handling, at the hypervisor, a hypercall from the guest software in response to the data matching the hypercall encoding; and
forwarding an exception to the second privilege level in response to the data not matching the hypercall encoding.

13. The non-transitory computer readable medium of claim 12, wherein the hypercall encoding includes at least one magic number stored in at least one of the plurality of registers.

14. The non-transitory computer readable medium of claim 8, wherein the returning comprises setting an instruction pointer to point to a next instruction of the guest software.

15. A computing system, comprising:
a hardware platform having a processor and a memory, the processor having at least three hierarchical privilege levels including a third privilege level more privileged than a second privilege level, the second privilege level more privileged than a first privilege level;
a software platform executing on the hardware platform, the software platform including a hypervisor executed by the processor at the third privilege level and configured to:
configure the processor to trap reads to a debug communication channel (DCC) status register of the processor to the third privilege level;
trap a read to the DCC status register by guest software executing in a virtual machine (VM) managed by the hypervisor, the guest software executing at the first or second privilege level;
read a plurality of registers of the processor to obtain data stored by the guest software; and
return execution to the guest software.

16. The computing system of claim 15, wherein the configuring comprises:
virtualizing a first debug control register for the first privilege level that allows for trapping reads to the DCC status register to the first privilege level.

17. The computing system of claim 16, wherein the configuring comprises:
setting a field of a debug configuration register for the third privilege level to trap access to the DCC status register to the third privilege level.

18. The computing system of claim 16, wherein the read to the DCC status register by the guest software comprises a read instruction from the DCC status register to a zero register of the processor.

19. The computing system of claim 15, wherein the hypervisor is further configured to:
determine whether the data stored in the plurality of registers matches a hypercall encoding;
handle a hypercall from the guest software in response to the data matching the hypercall encoding; and
forward an exception to the second privilege level in response to the data not matching the hypercall encoding.

20. The computing system of claim 19, wherein the hypercall encoding includes at least one magic number stored in at least one of the plurality of registers.

* * * * *